(12) United States Patent
Golla et al.

(10) Patent No.: US 6,587,874 B1
(45) Date of Patent: Jul. 1, 2003

(54) DIRECTORY ASSISTED AUTOINSTALL OF NETWORK DEVICES

(75) Inventors: Ramprasad Golla, Milpitas, CA (US); Shankar Natarajan, Fremont, CA (US); Raymond John Bell, Mill Valley, CA (US); Fan Jiao, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/342,860

(22) Filed: Jun. 29, 1999

(51) Int. Cl.[7] .................. G06F 15/177; G06F 17/30
(52) U.S. Cl. .................................. 709/220; 707/100
(58) Field of Search ............................... 709/220, 221, 709/222; 707/100

(56) References Cited

U.S. PATENT DOCUMENTS

| | | | | |
|---|---|---|---|---|
| 5,838,918 A | * | 11/1998 | Prager et al. ............... | 709/221 |
| 5,956,719 A | * | 9/1999 | Kudo et al. ................. | 707/10 |
| 6,009,103 A | * | 12/1999 | Woundy ..................... | 370/401 |
| 6,023,699 A | * | 2/2000 | Knoblock et al. ........... | 707/10 |
| 6,192,362 B1 | * | 2/2001 | Schneck et al. ............. | 707/10 |
| 6,233,616 B1 | * | 5/2001 | Reid .......................... | 709/225 |
| 6,298,354 B1 | * | 10/2001 | Saulpaugh et al. ......... | 707/103 R |
| 6,321,259 B1 | * | 11/2001 | Ouellette et al. ........... | 709/220 |
| 6,330,560 B1 | * | 12/2001 | Harrison et al. ............. | 707/8 |
| 6,366,954 B1 | * | 4/2002 | Traversat et al. ........... | 709/220 |

FOREIGN PATENT DOCUMENTS

WO    WO 99/33211    * 7/1999

OTHER PUBLICATIONS

M. Wahl, T. Howes, and S. Kille, Netscape Communications Corp. "Lightweight Directory Access Protocol", Dec. 1997.

www.people.netscape.com, website printout titled, "A System Administrator's View of LDAP", dated Mar. 5, 1999, pp. 1–4.

www.ietf.cnri.reston.va.us/rfc/rfc2131.txt, website printout titled, Dynamic Host Configuration Protocol, by R. Droms of Bucknell University, Mar. 1997, website printout dated Mar. 5, 1999, pp. 1–39.

* cited by examiner

*Primary Examiner*—Kenneth R. Coulter
(74) *Attorney, Agent, or Firm*—Beyer, Weaver & Thomas LLP (57) ABSTRACT

Client network devices and configuration servers are used together to automatically configure the client network devices. Configuration information for multiple network devices is arranged in a multi-level directory. Leaf nodes in a hierarchical directory correspond to specific network devices. Configuration information associated with such leaf nodes is specific to the associated network device. Configuration information common to a group of network devices is provided with nodes at higher levels in the hierarchy. All network devices grouped under such higher levels inherit the configuration parameters from the higher level nodes. During configuration, all nodes from a leaf to the root of a directory are traversed. The parameters associated with each node are aggregated to obtain a set of parameters provided to the client network device. These aggregated parameters are used to automatically configure the client network device.

45 Claims, 9 Drawing Sheets

DIRECTORY ASSISTED AUTOINSTALL OF NETWORK DEVICES

BACKGROUND OF THE INVENTION

The present invention relates to systems and methods for configuring network devices such as routers and switches. More specifically, the invention relates to using hierarchical directories to aggregate configuration information for specific network devices.

In large complex networks, it is necessary to configure and reconfigure many network devices such as routers and switches with network information such as interface IP addresses, security policies, quality of service parameters for traffic shaping, etc. Each network device in a given network will have a unique set of such configuration parameters. Nevertheless, many individual configuration parameters within the larger set of device-specific configuration parameters are common to a group of network devices.

In conventional approaches to configuring or reconfiguring network devices, a network administrator must provide the full complement of configuration parameters directly to the network device or indirectly through a network server storing such parameters. In either case, the entire set of device parameters must be provided for each and every device on the network. Current server-based procedures for automatically configuring network devices require using BOOTP/TFTP or a related protocol to obtain the complete set of configuration parameters from a server and download them to the specific network device requiring configuration. The entire configuration file for each router handled by the server must be separately stored.

Unfortunately, the current procedures for configuring network devices all involve significant effort in providing the complete set of configuration information directly to the network device or indirectly to that device through a network server. What is needed therefore is an improved method for automatically generating the configuration information and for configuring network devices.

SUMMARY OF THE INVENTION

The present invention provides client network devices and configuration servers and associated methods for automatically configuring the client network devices. This may be accomplished by arranging configuration information for multiple network devices in a multi-level directory. Leaf nodes in a hierarchical directory may correspond to specific network devices. Configuration information associated with such leaf nodes may be specific to the associated network device. Configuration information common to a group of network devices may be provided with nodes at higher levels in the hierarchy. All network devices grouped under such higher levels inherit the configuration parameters from the higher level nodes. This arrangement reduces the amount of storage required for configuring multiple network devices. During configuration, all nodes from a leaf to the root of a directory may be traversed. The parameters associated with each node in the traversed path are aggregated to obtain a set of parameters provided to the client network device.

Thus, the present invention provides methods and apparatus for configuring a network device. The network device to be configured is identified. An entry for the network device is identified from among a collection of network device entries in a directory. Configuration parameters for the network device are obtained from a plurality of nodes in the directory.

According to one embodiment, IP addresses for interfaces of the network device are obtained, and configuration parameters for the network device are obtained from an LDAP server.

According to another embodiment, a server apparatus is provided which provides configuration information for a plurality of network devices. The server apparatus includes one or more processors, and a memory coupled to the one or more processors. A multi-level grouping of the plurality of network devices is logically represented on at least one of the processors and memory. Configuration parameter containers associated with specific levels of the grouping are also provided. At least some of the containers of parameters are associated with multiple network devices.

According to yet another embodiment, a server apparatus is provided which provides configuration information for a plurality of network devices. The server apparatus includes a multi-level grouping of nodes representing the plurality of network devices. The server apparatus also includes configuration parameter containers associated with specific nodes of the grouping. At least some of the containers specify parameters associated with multiple network devices. The server apparatus further includes means for identifying nodes associated with specific network devices, and means for obtaining configuration parameters for specific network devices.

These and other features of the present invention will be presented in more detail in the following detailed description of the invention and the associated figures.

DESCRIPTION OF THE PREFERRED EMBODIMENTS

Figure 1A:
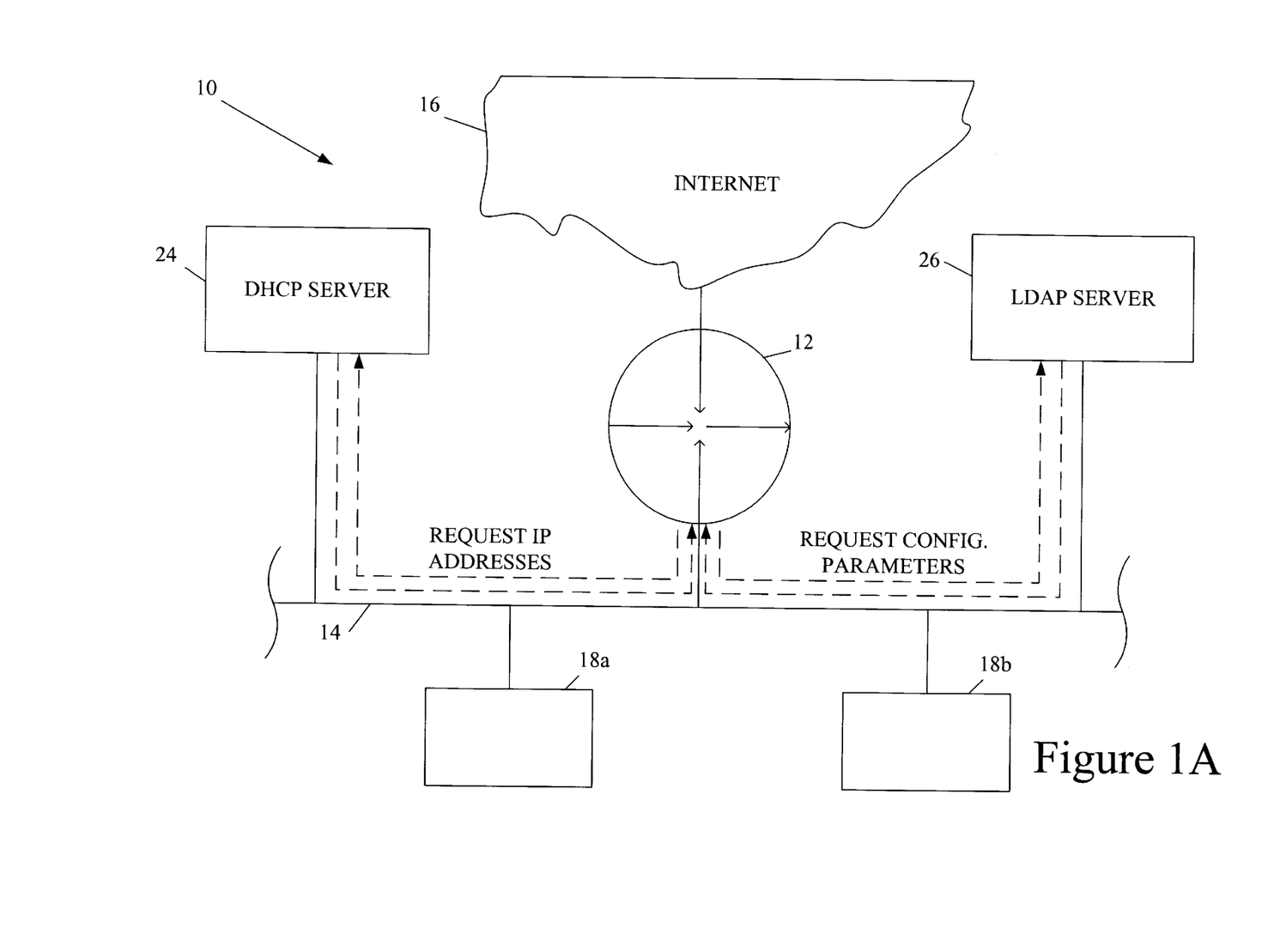
FIG. 1A is a network diagram depicting the interaction of a network device, a DHCP server, and an LDAP server to autoconfigure the network device in accordance with an embodiment of this invention.

FIG. 1A presents a network environment 10 containing various network entities that participate in configuring a network device 12. In the illustrated environment, network device 12, may be a gateway router, for example. In the arrangement shown, at least one of its interfaces connects to the Internet 16. At least one other interface connects with a local network 14, which includes various network nodes such as arbitrary entities 18a and 18b.

Network device 12 is identified by its hardware address or some form of client identifier. For network devices having multiple interfaces, DHCP may be used through each interface to obtain configuration information. To be configured, network device 12 initially obtains the necessary IP addresses for its interfaces. To do this, it constructs a DHCP request for IP addresses, which it then sends to a Dynamic Host Configuration Protocol ("DHCP") server 24. Using the standard DHCP protocol (or any other suitable protocol for identifying and providing IP addresses), server 24 identifies the IP addresses for the interfaces of network device 12. It returns these addresses to device 12 over network 14. DHCP is described in RFC 2131, which is incorporated herein by reference for all purposes.

Knowing its IP address(es), the network device does a DNS query to resolve its name. The DNS query is sent to a DNS server that maintains a table of bindings (i.e., IP address, hostname). The DNS response to the network device contains the name of the network device, i.e., the "hostname", and the network device may now be identified by its name.

The network device then does a TFTP broadcast for a configuration file with the name "hostname_config." A TFTP server responds to this request by sending out the hostname_config file to the network device. The hostname_config file contains information about the closest LDAP server, the username, and password. The username and password are required to access the LDAP server.

With the IP addresses now configured, network device 12 can communicate with a Lightweight Directory Access Protocol ("LDAP") server 26 using TCP/IP. To accomplish this, network device 12 possesses "client code" which provides the functionality necessary to communicate via the LDAP protocol. Preferably, this client code forms part of an operating system or application running on network device 12.

Initially, LDAP server 26 authenticates network device 12 using a suitable authentication protocol. After authentication, network device 12 constructs a LDAP request for its configuration parameters. The request includes the name or "principal" of device 12. When LDAP server 26 receives this request, it obtains the appropriate configuration parameters for device 12 from its LDAP directory and associated data structures. It then sends a reply to network device 12 including the requested configuration parameters.

Examples of configuration parameters required for typical network devices include access filters (e.g. for firewalls), quality of service parameters (e.g., for traffic shaping), route information, etc. Specifically, such configuration parameters may include global router configuration commands such as, for example, protocol routing/activation, user access and privileges, protocol process activation, and access lists. The configuration parameters may also include interface specific configuration commands such as, for example, interface type (e.g., ISDN, ethernet, token ring, serial), interface encapsulation (e.g., ARPA, frame relay, PPP), interface state (e.g., up/down, etc.), interface protocol. Protocol specific configuration commands may also be included among the configuration parameters including, for example, protocol parameters and resources. Network device 12 may be any type of device that requires configuration and is attached to a network. Common examples include routers, switches, cable modem termination systems, dial access servers, voice gateways, PBX, access routers, concentrators, WAN switches, etc. In a preferred embodiment, such devices run an operating system or application that allows them to communicate via the LDAP protocol. Note that the configuration process of this invention is not limited to devices devoted entirely to routing or otherwise controlling network traffic. The invention may also apply to work stations, personal computers, laptop computers, and other such devices that need to be configured and are connected via a network.

LDAP server 26 may generally be any server that provides configuration information for a collection of network devices, which look to it for such configuration information. Preferably, the configuration information is arranged such that commonly used pieces or blocks of such configuration information are stored only once, or a few times, rather than stored separately for each network device requiring configuration information. One way of achieving this result is through a hierarchical directory of network devices. Various nodes in the hierarchy could contain or point to blocks of common configuration parameters. LDAP is a protocol that makes use of such hierarchical directories.

Figure 1B:
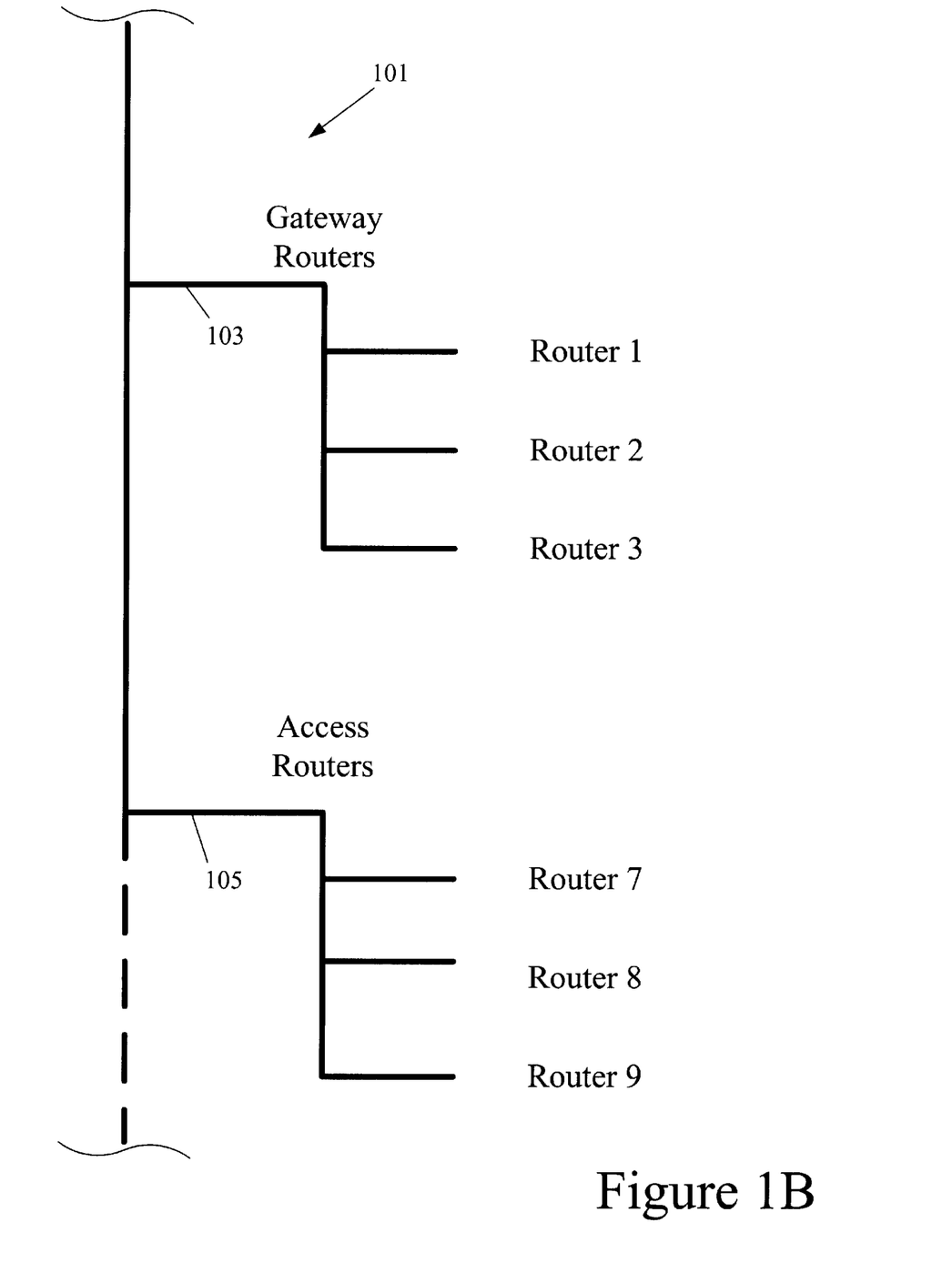
FIG. 1B is an illustration of a hierarchy of network devices that may be provided on an LDAP server to uniquely identify network devices served by that server in accordance with an embodiment of this invention.

FIG. 1B depicts a simple directory tree segment for a few network devices (routers in this example). As shown, a directory tree segment 101 includes a branch 103 of gateway routers and a branch 105 of access routers. Gateway routers branch 103 includes three leaves, each denoting a separate gateway router. In this example, those routers are denoted router 1, router 2, and router 3. Similarly, access routers branch 105 includes three leaves, denoted router 7, router 8, and router 9.

In LDAP, the individual leaves (entries) of the directory tree are sometimes referred to as "distinguished names" or "principals." In this invention, an LDAP request including the principal for the network device under consideration will trigger the LDAP server to obtain all the configuration information for that network device by tracing a path from the principal leaf of the directory to its root.

Each entry of a directory tree on an LDAP server has a "type," which is defined by an object class. An object class defines attributes, both required and optional, associated with an entry of that class. Each entry is uniquely identified by a distinguished name, or DN. The DNs are organized in a hierarchy; each one includes the name of an entry plus a path of names tracing the entry back to the root of the tree.

For example, for a person working at a US company (or a network device located in that company), the top entry in the hierarchy for person or machine entry has the DN "c=US". This top entry is of the object class "country". A country entry has one required attribute, c, with the value of "US" in this case. At the next level down in the hierarchy, an entry of the object class organization may have the DN "o=Cisco Systems, Inc., c=US". The organization entry requires the attribute o, which is "Cisco Systems, Inc." in this case. Notice that the parts of the DN are separated by commas.

The DN described so far, at the organization level, would likely be the base DN for a given server. A base DN defines the top of the namespace that the server is responsible for, much like a DNS zone. As an organization adds entries further down the hierarchy, the DNs become longer.

An entry for an individual or a machine may have the following DN:

"cn=RouterA1234, o=Cisco Systems, Inc., c=US"

There are four well-defined pieces of the overall LDAP system that simplify implementing LDAP: the LDAP open standard, the API, the LDIF text format for data, and the object class definitions.

The LDAP standard is described at various locations including RFC 1777, RFC 1778, and RFC 2251 available from the Internet Engineering Task Force (http://www.ietf.cnri.reston.va.us/home.html). These references are incorporated herein by reference in their entireties and for all purposes. The University of Michigan, where LDAP evolved, has source code for their original slapd server and other tools available for download. Of course, other codes sources also exist.

LDAP is an Internet standard for accessing specialized directory services that run over TCP/IP. One or more LDAP servers contain the data that make up an LDAP directory tree. An LDAP client connects to an LDAP server and submits a query to request information or submits information to be updated. If access rights for the client are granted, the server responds with an answer or possibly with a referral to another LDAP server where the client can have the query serviced.

LDAP uses object-oriented hierarchies of entries. The directory and protocol are designed so that host or user names, once assigned in the hierarchy, can be rapidly looked up thousands of times. In fact, directory servers with a million or more entries can respond to hundreds of search requests per second. Replication is also possible, which makes LDAP very scalable.

Regarding an LDAP API, for a program to make use of LDAP directory information, it should include the LDAP API libraries in the source directory. The program's code should have provisions to call the API functions at the point where the information needs to be looked up, and recompiled. The most recent versions of sendmail and Cisco IOS already include the API and have options to look up information through LDAP.

The LDIF file format is an ASCII text format which is used for exporting and importing data to and from LDAP servers. It not only makes it easy to migrate data from one server to another but also allows system administrators to write scripts to create LDIF files from other data sources. This allows the user to verify and manipulate the LDIF file before committing the data to the server. Because command-line tools like ldapsearch return data in LDIF format, users can save some or all of their data to a file, make global changes, and then import the new data back into the server.

Regarding object classes, if a client needs some attributes that are not in well-known object class definitions, a new object class can be created as an extension of a similar object class, or an existing object class can be extended to encompass the attributes. The client can then work with any LDAP server, as long as the server has been given this new object class definition.

In order for authoritative information to be maintained, access control needs to be imposed for privileges to read, write, search, or compare. Access control can be done on a subtree, entry, or attribute type and granted to individuals, groups, or "self" (which allows an authenticated user to access his or her own entry). LDAP also allows a Bind operation in which authentication information can be exchanged between the client (network device) and the server.

Figure 2A:
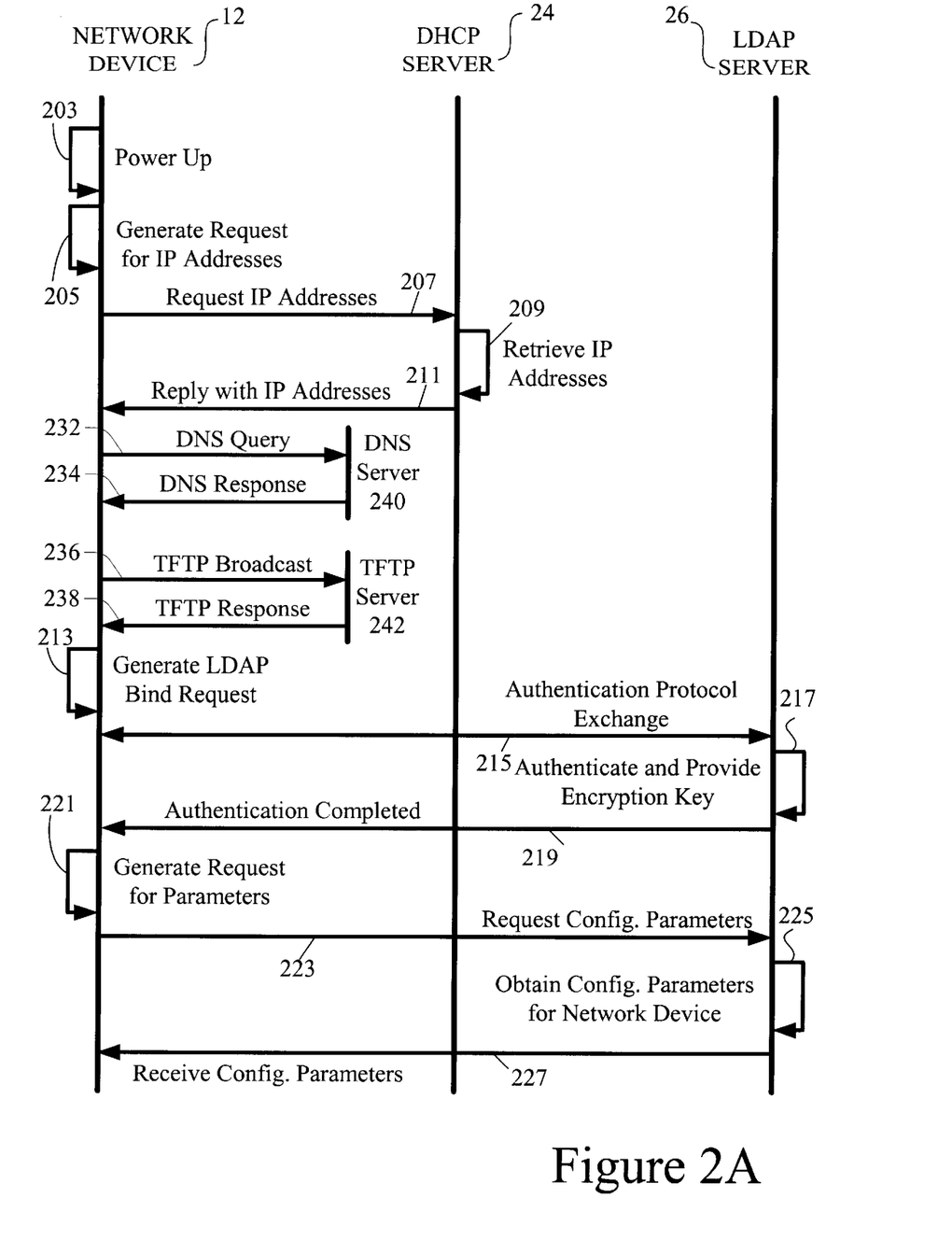
FIG. 2A is an interaction diagram depicting procedures that may be employed to autoconfigure a network device in accordance with an embodiment of this invention.

Turning now to FIG. 2A, a process flow diagram depicting the roles of various entities in configuring a network device 12 is shown. The entities under consideration include network device 12, DHCP server 24, and LDAP server 26. It should be understood that the DHCP and LDAP protocols are referenced for the sake of convenience. Other systems or protocols such as X.500 DAP may provide at least some of the described services and structures in other embodiments.

Initially, network device 12 powers up at 203. Typically, this operation will be of interest only when device 12 is being installed in the network for the first time or is in need of reconfiguration. After powering up, device 12 generates a request for the IP addresses required of its interfaces. See 205. The request may contain the device's hardware address (es) as specified by the DHCP protocol (RFC2131). See 207. The DHCP server 24 receives the request and identifies and retrieves the appropriate IP addresses at 209. It then replies with these IP addresses, at 211, pursuant to the DHCP protocol.

Knowing its IP address(es), network device 12 does a DNS query 232 to resolve its name. DNS query 232 is sent to a DNS server 240 that maintains a table of bindings (i.e., IP address, hostname). A DNS response 234 to network device 12 contains the name of network device 12, i.e., the "hostname", and network device 12 may now be identified by its name.

Network device then does a trivial FTP (TFTP) broadcast 236 for a configuration file with the name "hostname_config." A TFTP server 242 responds to this request by sending out the file hostname_config to network device 12 (TFTP response 238). The hostname config file contains information about the closest LDAP server (e.g., LDAP server 26), the username, and password. The username and password are required to access the LDAP server.

Network device 12 now has the necessary IP addresses, which it stores in non-volatile memory. Thus, device 12 is now in a position to communicate with other network entities via TCP/IP. One such entity is LDAP server 26, with which device 12 initiates communication. Initially, device 12 generates an initial LDAP Bind Request packet at 213. Because network device 12 must first be authenticated with LDAP server 26, the Bind Request LDAP packet should be met with an authentication challenge from server 26 and a subsequent authentication exchange 215. The exchange takes place between device 12 and server 26. In a specific embodiment, this exchange follows the protocol outlined in RFC 2251. This may consist of a series of server challenges and client responses specific to the security layer under LDAP.

Various authentication protocols are suitable for use with this invention. In a preferred embodiment, the Simple Authentication and Security Layer (SASL) protocol is employed. This Internet standard is described in RFC 2222, which is incorporated herein by reference for all purposes. During the SASL authentication protocol exchange, the protocol performs authentication, transmits an authorization identity (frequently known as a user ID) from the client to the server, and negotiates the use of a mechanism-specific security layer. If the use of a security layer is agreed upon, then the mechanism may also define or negotiate an appropriate encryption key. Subsequent communications during the session may be encrypted with this key. This is indicated in FIG. 2A, at 217, where LDAP server 26 authenticates device 12 and provides an encryption key. Server 26 then notifies device 12 that authentication has been completed at 219. Other authentication mechanisms may be employed. In a simple example, only a password is used to authenticate. According to various specific embodiments, a variety of encryption techniques may be employed.

Device 12 is now in condition to obtain the configuration parameters from server 26. At 221, device 12 generates a request for a block of configuration information. In this example, the request conforms to the LDAP standard and is sent to LDAP server 26. According to a specific embodiment, the LDAP request has the LDAP standard format, includes an operation name (OID), and specifies BER encoding. According to a more specific embodiment, the configuration information is provided as BER encoded blocks which are accessed as "C" data structures through APIs. The LDAP request also gives the name ("principal") for the network device 12. This principal is the name or identification of the network device as it appears in the LDAP directory tree.

The request for configuration parameters is transmitted to server 26 at 223. Server 26 obtains the relevant configuration parameters for device 12 at 225. In this example, these parameters are obtained via an LDAP directory using the LDAP protocol. As described in more detail below, the configuration parameters may be obtained via an augmented form of LDAP in which common configuration parameters are referenced by nodes on an LDAP directory tree. Note that device 12 may request all of the configuration parameters that it requires (the normal case) or some subset of those parameters (the special case). The subset may include only those parameters related to quality of service or access control, for example.

After the appropriate configuration parameters have been obtained for device 12, LDAP server 26 forwards those parameters to device 12 at 227. These parameters may be provided in the format specified by the LDAP standard.

Figure 2B:
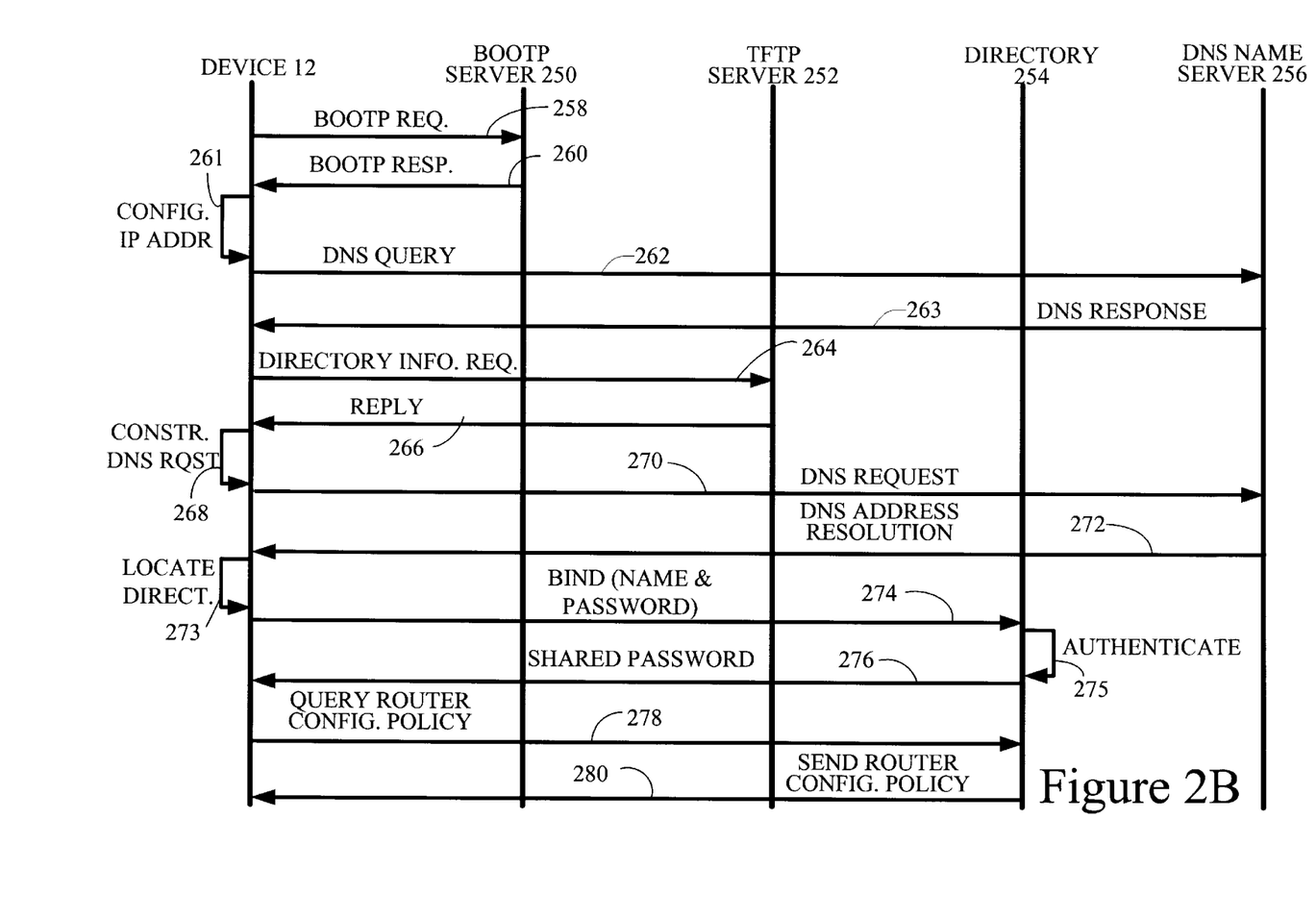
FIG. 2B is an interaction diagram depicting procedures that that may be employed to autoconfigure a network device in accordance with another embodiment of this invention.

FIG. 2B shows another preferred procedure for configuring network devices in accordance with this invention. In this example, the participating entities include the network device to be configured (device 12), a BOOTP server 250, a trivial FTP server 252, a directory 254 (e.g., a portion of an LDAP directory), and a DNS name server 256. Together, these entities allow device 12 to be configured with appropriate parameters. As indicated above, a network device which is device 12 in this example initially needs to have IP addresses on its interfaces before it can conduct certain important network communications. To this end, device 12 sends a BOOTP request 258 to BOOTP server 250. Server 250 then identifies the appropriate IP addresses for the interfaces of device 12 by using the BOOTP protocol. Server 250 then constructs a BOOTP response containing the IP addresses for the interfaces of device 12 and forwards that response back to device 12 as indicated at 260. Note that BOOTP server 250 may be a router or other network device or a host server on the network.

Device 12 now configures its interfaces with the IP addresses received in the BOOTP response. See 261. Using its IP addresses, network device 12 does a DNS query 262 to resolve its name. DNS query 262 is sent to a DNS server 256 that maintains a table of bindings (i.e., IP address, hostname). A DNS response 263 to network device 12 contains the name of network device 12, i.e., the "hostname", by which network device 12 may now be identified.

With its IP addresses now installed, device 12 can communicate with TFTP server 252. As illustrated, device 12 sends a TFTP request (264) to TFTP server 252. The request identifies device 12 by its IP address and asks for information required to find directory 254. Server 252 employs the trivial FTP protocol to construct and send a reply (266) to device 12. That reply includes a domain name for a directory having the device's configuration parameters. The reply also includes a directory password that device 12 will ultimately use to initiate communication with directory 254.

With the domain name now in hand, device 12 constructs a DNS request at 268. The purpose of this request is to identify the IP address of directory 254. Device 12 sends a DNS request at 270 to DNS server 256. The request is prepared by software on device 12 acting in accordance with the DNS standard. Name server 256 receives the request and processes it according to standard DNS procedure. In a specific embodiment, server 256 responds with a service record including multiple IP addresses corresponding to multiple directory servers, each containing a logical partition of a larger directory (e.g., an LDAP directory containing configuration parameters for all network devices on a network of interest). As illustrated, server 256 replies at 272 with the service record.

In the embodiment depicted, device 12 now has a number of IP addresses for various directory partitions which should contain its configuration parameters. It must determine which of these directories will most efficiently fill its request. To make the decision, it may use a procedure such as the directory location service API. This API provides for sending ping messages to the various directories identified in the service record from server 256. The directory location service API is well known in the field. Other procedures may be used for this purpose as well. Further, server 256 may be configured to provide an "A record" containing the IP address of only a single directory. In such case, device 12 need not determine which directory to communicate with.

After device 12 locates the most appropriate directory for its needs at 273, it performs a Bind with that directory at 274. Specifically, it performs Bind with its name and the password obtained from TFTP server 252. The bind is performed with directory 254. At this point, directory 254 authenticates device 12 at 275 and the two devices negotiate a shared security content. That security content is then passed back to device 12 at 276. This allows further communication between device 12 and directory 254 to be encrypted.

Although a variety of different encryption mechanisms may be employed, according to a specific embodiment, the encryption is based on an SASL mechanism such as that described in RFC 2222, the entirety of which is incorporated herein by reference for all purposes. According to another specific embodiment, the encryption is based on GSS-APIs over Kerberos (see RFC 1964, the entirety of which is incorporated herein by reference for all purposes).

Next, as indicated at 278, device 12 queries directory 254 for its router configuration policy. Directory 254 responds with the router configuration policy for device 12. See 280. The query and the reply (containing the configuration policy) are encrypted. The configuration policy may be obtained as described below.

Figure 3:
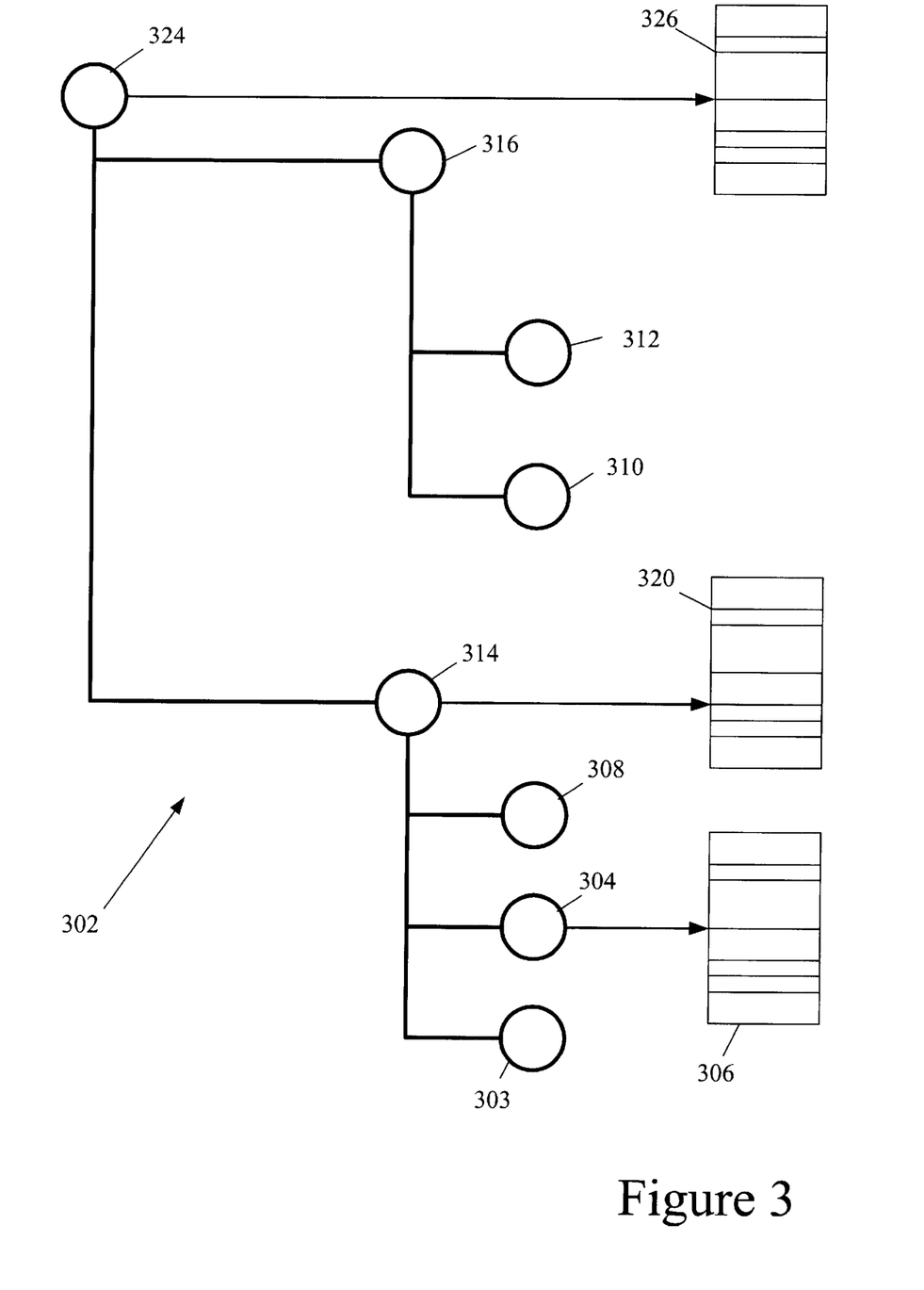
FIG. 3 is a hierarchical arrangement of network device nodes and associated configuration containers for an LDAP server in accordance with an embodiment of this invention.

FIG. 3 depicts a containment hierarchy 302 which allows an LDAP server to obtain the complete set (or a subset) of the configuration information for a particular router in its directory. Note that container hierarchy 302 is a more detailed example of a general LDAP directory tree useful with this invention as originally shown and described with reference to FIG. 1B. As depicted, container hierarchy 302 includes at least three levels. At the lowest level, one or more leaf nodes such as node 304 represent individual network devices. These devices may be identified within the hierarchy (directory) by router name or "principal." Each leaf node may or may not point to a specific container. As shown in FIG. 3, leaf node 304 points to a container 306. These containers contain the configuration parameters necessary to configure a network device specified in hierarchy 302. In a preferred embodiment described with reference to FIG. 5, each of these containers is represented as a template that has a complete set of configuration parameters that may be specified. In any given container, only a subset of those parameters will have associated values, for example. Other leaf nodes in hierarchy 302 include a leaf node 308, a leaf node 310, and a leaf node 312. Each of these represent a separate network device handled by the associated LDAP server. For convenience, none of these leaf nodes is shown to point to an associated configuration parameter container. Note that a leaf node does not necessarily have to point to a particular configuration parameter container. The associated network device may obtain its configuration parameters exclusively from containers associated with higher level container nodes.

One level above the leaf node level, container hierarchy 302 includes certain branch level nodes including a container node 314 and a container 316. As shown in this example, the container node 314 points to a configuration parameter container 320. Normally, container 320 will include configuration parameters that are common to all network devices specified by leaf nodes under container node 314 (i.e., nodes 304 and 308 in this example).

Each successively higher level in a container hierarchy may specify additional common configuration parameters through configuration parameter containers. In the example, FIG. 3, there are only three levels in container hierarchy 302. A root level node 324 points to a configuration parameter container 326. In many cases, the container associated with the root level node will contain most of the configuration parameters used by routers identified in the hierarchy. This is because most routers on a given network will share many configuration parameters. Because most of these parameters are stored in a single location, rather than separately for each individual network device, this invention efficiently stores and makes available the configuration parameters for many different network devices.

Figure 4:
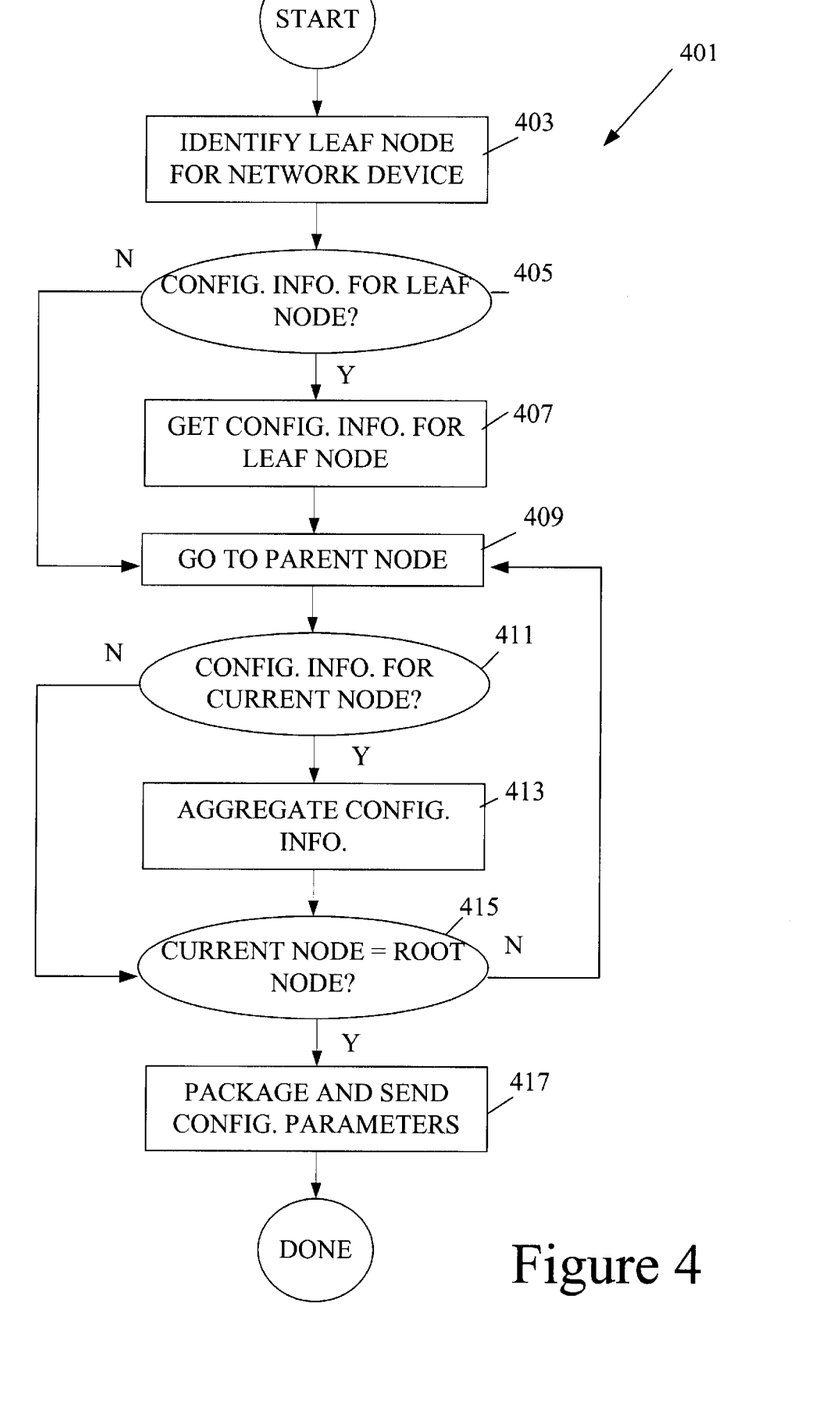
FIG. 4 is a process flow diagram depicting how configuration parameters may be aggregated from a hierarchy as depicted in FIG. 3.

FIG. 4 provides a process flow diagram for obtaining configuration parameters from a container hierarchy (e.g., hierarchy 302) in accordance with an embodiment of this invention. This may be referred to as a "hierarchical inheritance" operation. Microsoft's GPO service is one example of a technique that may be suitable for implementing the aggregation of parameters for a configuration. The process 401 begins at 403 with the server identifying the leaf node corresponding to the network device under consideration. Note that such network device may have been identified as the "principal" in an LDAP request. After the leaf node has been identified, the server determines whether there is any configuration information for that leaf node at 405. In the example depicted in FIG. 3, this question will be answered by determining whether the leaf node under consideration points to a container. Assuming for now that the leaf node does have associated configuration information, the server obtains that configuration information at 407. Such configuration information may be temporarily stored or provided for assembly in an LDAP reply message, for example.

After obtaining the configuration information for the leaf node, the server moves up one level in the directory tree to the parent node for the leaf node under consideration. See 409. Note that if there is no configuration information for the leaf node (i.e., 405 is answered in the negative), process control is directed to 409, without obtaining any configuration information prior to that.

The parent node may contain its own configuration information. As indicated in the discussion of FIG. 3, such configuration information is typically common to a number of network devices specified by leaf nodes under the parent node. As illustrated in FIG. 4, the server determines, at 411, whether there is any configuration information for the current node. If so, it aggregates that configuration information with any other configuration information it may have previously obtained for the network device under consideration. See 413. Process control is now directed to 415. Note that if there is no configuration information for the node under consideration (i.e., 417 is answered in the negative), process control is also directed to 415.

After 415, the server determines whether the current node is the root node. If not, it must traverse further up the container hierarchy. As indicated in FIG. 4, when this is the case, process control is directed back to 409 where the parent to the current node is considered. While at the new parent node, the server determines whether there is any configuration information associated therewith at 411, as described above. If so, that information is aggregated at 413 and the process proceeds as described above.

Eventually, the server traces the path along the container hierarchy all the way to the root node. At that point, decision operation 415 is answered in the affirmative. Then, process control is directed to 417 where the server packages and sends the configuration parameters to the network device it has established a session with. Preferably, the parameters are packaged and sent via the LDAP protocol. The process is then completed.

As indicated, the server aggregates configuration information from containers associated with various nodes in the container hierarchy. Typically, the containers for each node encountered while tracing the path from leaf to route in the directory tree contain parameters that are not specified in any of the other containers encountered during the tracing operation. However, it sometimes may occur that two or more containers include values for the same configuration parameter. If these values are the same, this does not pose a problem. However, in some cases, the values may conflict. When this is the case, the server preferably elects to use the parameter value specified in the lower level of the directory tree. Thus, during the aggregation process, only the lowest level value is preserved for a conflicting configuration parameter.

Figure 5:
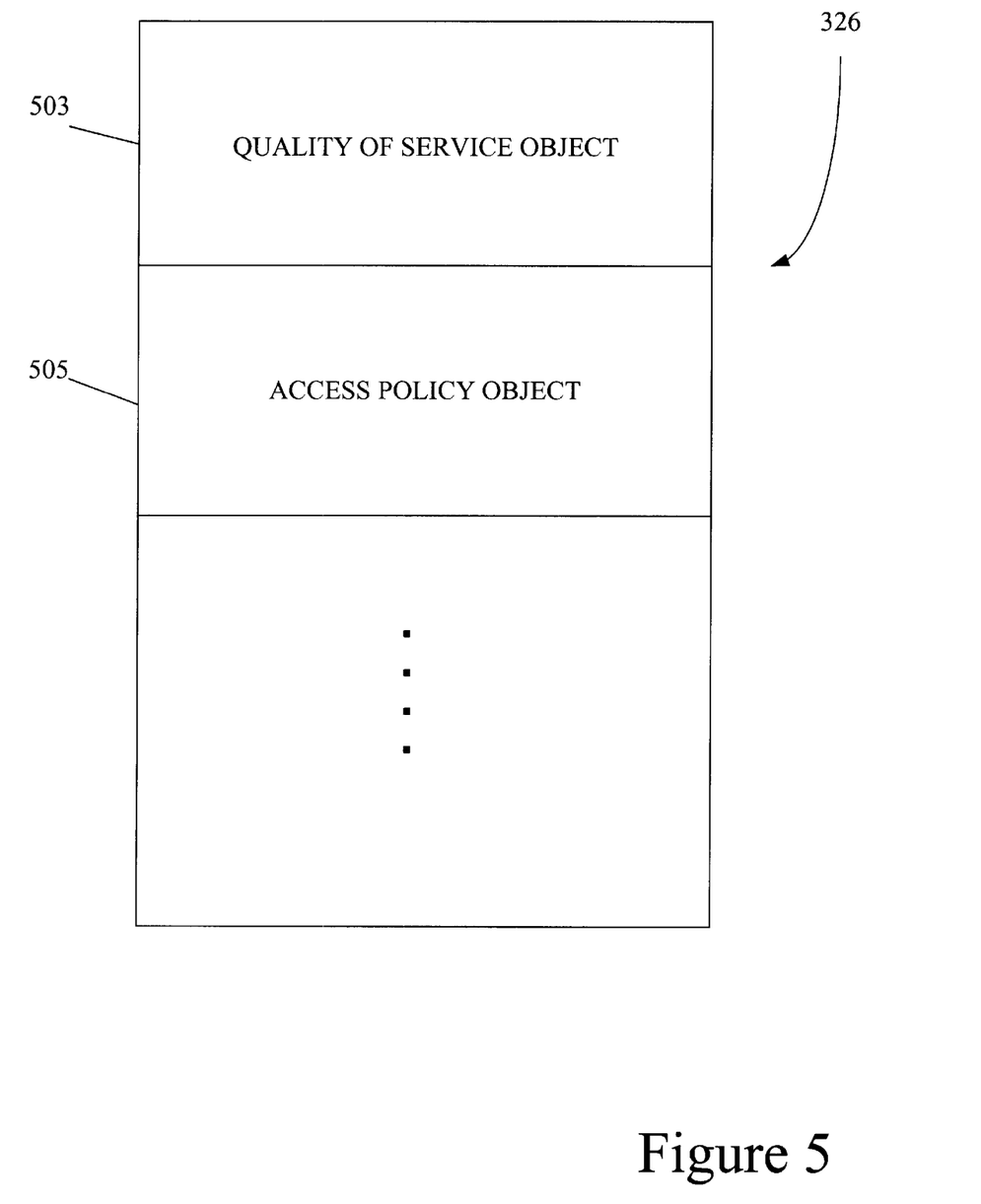
FIG. 5 is a block diagram depicting a container for holding values of network parameters as provided on a container hierarchy of this invention.

An example may help explain this issue. A company's policy may specify that all devices have 8-bit passwords. This information may be provided in a container associated with a root level node (e.g., container 326 in FIG. 3). However, the company may also specify that devices used in the engineering department contain a 10-bit password. Container 320 may specify a 10-bit password, for example. Assuming that the device under consideration is in the engineering department, it will be configured with a 10-bit password, rather than an 8-bit password. This is because the 10-bit is specified at a lower level in the container hierarchy than the 8-bit password. FIG. 5 depicts one possible version of container 326 shown in FIG. 3. It may include fields or sections for each of the types of configuration parameters that might be used to configure network device 12. In a preferred embodiment, it is a set of objects, with each object belonging to particular container configuration information. In the example shown in FIG. 5, the first object 503 belongs to quality of service configuration parameters. In addition, container 326 includes an object 505 which belongs to access policy configuration parameters. Of course, numerous other objects might be provided in a given container, with each such object belonging to a different configuration parameter or other piece of configuration information.

Generally, automatic configuration methods of this invention can be implemented on software and/or hardware. For example, they can be implemented in an operating system kernel, in a separate user process, in a library package bound into network applications, on a specially constructed machine, or on a network interface card. In a preferred embodiment of this invention, automatic configuration technology is partially implemented in server software for accessing and assembling configuration information. It is also partially implemented in client code on a network device. Both components may be implemented in an operating system or in an application running on an operating system.

Figure 6A:
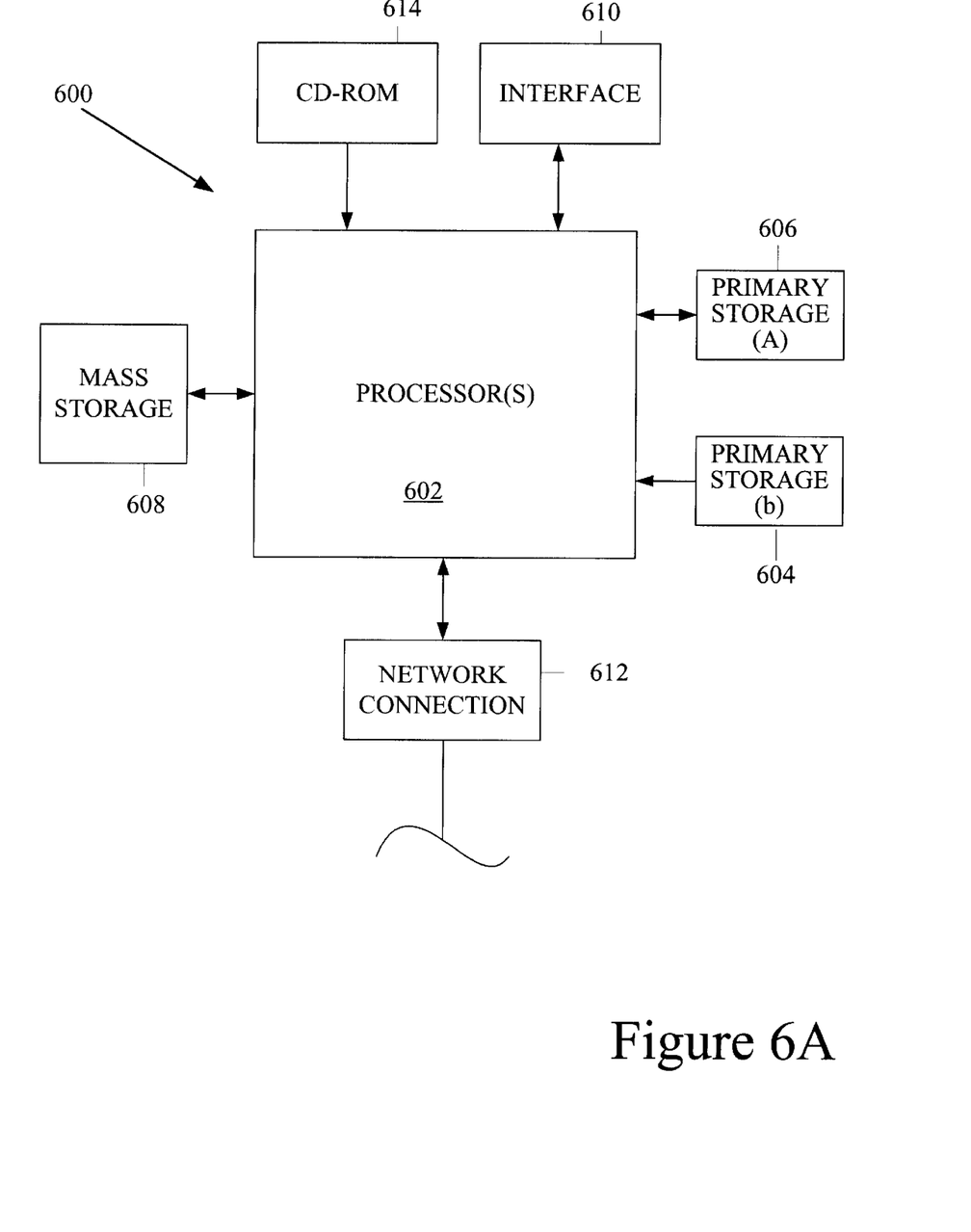
FIG. 6A is a block diagram of a hardware system or apparatus that may be employed to implement a configuration server in accordance with an embodiment of this invention.

FIG. 6A illustrates a typical computer system that may be used to run server software in accordance with an embodiment of the present invention. The computer system 600 includes any number of processors 602 (also referred to as central processing units, or CPUs) that are coupled to storage devices including primary storage 606 (typically a random access memory, or "RAM"), primary storage 604 (typically a read only memory, or "ROM"). As is well known in the art, primary storage 604 acts to transfer data and instructions uni-directionally to the CPU and primary storage 606 is used typically to transfer data and instructions in a bi-directional manner. Both of these primary storage devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than primary storage. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to a computer or telecommunications network using a network connection as shown generally at 612. With such a network connection, it is contemplated that the CPU might receive information from the network, or might output information to the network in the course of performing the above-described method steps. The above-described devices and materials will be familiar to those of skill in the computer hardware and software arts.

A network device that is configured in accordance with this invention typically includes multiple network interfaces including frame relay and ISDN interfaces, for example. Specific examples of such network devices include routers and switches. For example, the autoconfiguration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. The invention may be at least partially implemented on a card (e.g., an interface card) for a network device or a genera-purpose computing device.

Figure 6B:
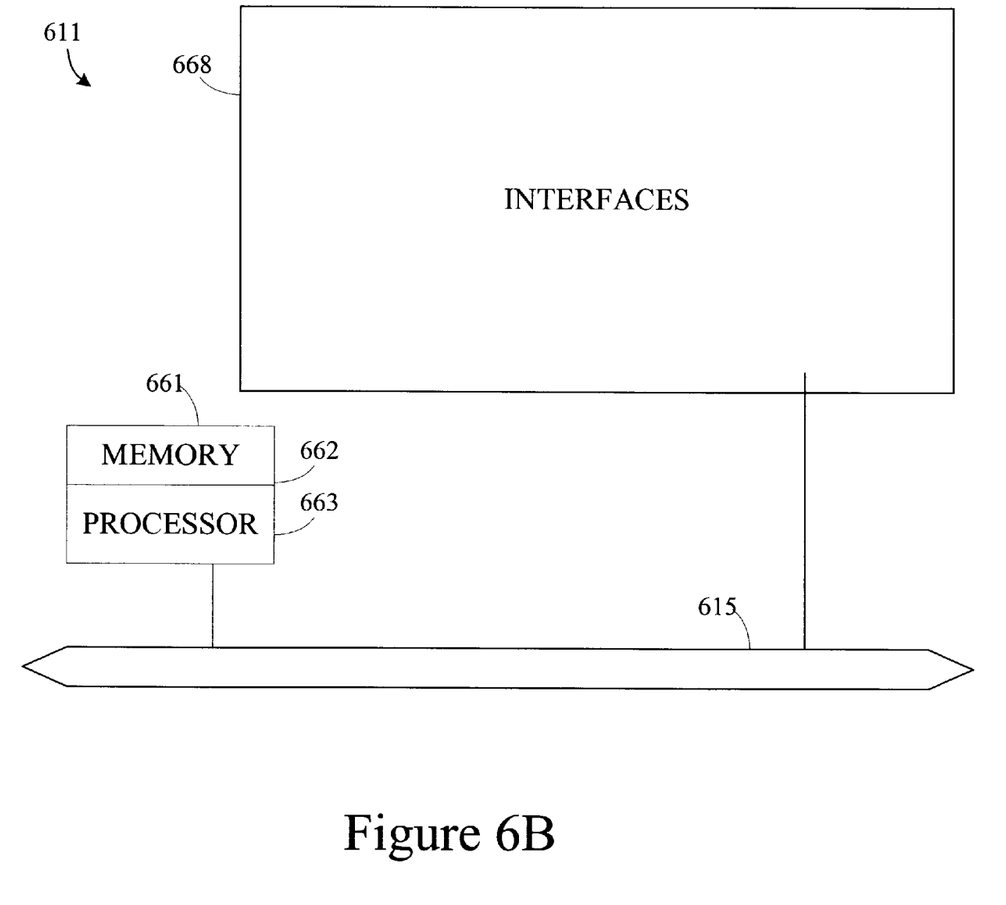
FIG. 6B is a block diagram of a hardware system or apparatus that may be employed to implement a network device in accordance with one embodiment of this invention.

Referring now to FIG. 6B, a router 611 suitable for implementing the present invention includes a master central processing unit (CPU) 662, interfaces 668, and a bus 615 (e.g., a PCI bus). When acting under the control of appropriate software or firmware, the CPU 662 is responsible for such router tasks as routing table computations and network management. It may also be responsible for issuing LDAP client communications, applying configuration data, etc. It preferably accomplishes all these functions under the control of software including an operating system (e.g., the Internetwork Operating System (IOS®) of Cisco Systems, Inc.) and any appropriate applications software. CPU 662 may include one or more processors 663 such as a processor from the Motorola family of microprocessors or the MIPS family of microprocessors. In an alternative embodiment, processor 663 is specially designed hardware for controlling the operations of router 611. In a preferred embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 611. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6B is one preferred router of the present invention, it is by no means the only router architecture on which the present invention can be implemented. For example, an architecture having a single processor that handles communications as well as routing computations, etc. is often used. Further, other types of interfaces and media could also be used with the router.

As indicated both server machines and client machines (e.g., routers) may employ one or more memories or memory modules configured to store program instructions for the general-purpose network operations and configuration operations described herein. The program instructions may control the operation of an operating system and/or one or more applications, for example. The memory or memories may also be configured to store relevant state information, data structures, etc., such as the configuration parameters described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims.

What is claimed is:

1. A method of configuring a network device, the method comprising:
   identifying the network device to be configured;
   identifying an entry for the network device from among a collection of network device entries in a directory, the directory including
      leaf nodes, each leaf node representing a separate network device, at least some of the leaf nodes referencing configuration parameters associated with the separate network device, and
      higher-level nodes above the leaf nodes, the higher-level nodes referencing configuration parameters common to all network devices specified by leaf nodes under a particular higher-level node;
   obtaining some configuration parameters referenced by the leaf nodes for the network device; and
   obtaining other configuration parameters referenced by the higher-level nodes for the network device.

2. The method of claim 1, wherein at least one of the plurality of nodes in the directory is a node corresponding to the entry of the network device to be configured.

3. The method of claim 1, wherein the network device is a router or a switch.

4. The method of claim 1, further comprising authenticating a request from the network device for its configuration parameters.

5. The method of claim 1, wherein the network device to be configured is identified by inspecting an IP packet from that network device.

6. The method of claim 1, wherein the network device to be configured is identified in an LDAP request.

7. The method of claim 6, wherein the network device to be configured is identified by its IP address provided in the LDAP request.

8. The method of claim 1, wherein the collection of network device entries is provided in a hierarchical directory.

9. The method of claim 8, wherein the hierarchical directory containing the collection of network device entries is an LDAP directory.

10. The method of claim 1, wherein obtaining the configuration information includes aggregating configuration parameters from the plurality of nodes.

11. The method of claim 1, wherein obtaining configuration information includes tracing a hierarchical path through the plurality of nodes.

12. The method of claim 11, further comprising checking for a parameter container at each of the plurality of nodes.

13. The method of claim 12, further comprising aggregating configuration parameters from each container encountered while tracing through the plurality of nodes.

14. The method of claim 13, wherein when a conflict occurs between configuration parameters in different containers encountered during tracing, selecting the configuration parameter from the container associated with the lowest level node in the plurality of nodes.

15. The method of claim 1, further comprising
   determining that fewer than all configuration parameters required to configure the network device have been requested by the network device; and
   sending only those configuration parameters requested by the network device.

16. The method of claim 1, wherein the configuration parameters include one or more of IP security parameteres, traffic shaping parameters, and access list parameters.

17. A method of configuring a network device based on a directory in an LDAP server, the directory including (a) leaf nodes, each leaf node representing a separate network device, at least some of the leaf nodes referencing configuration parameters associated with the separate network device; and (b) higher-level nodes above the leaf nodes, the higher-level nodes referencing configuration parameters common to all network devices specified by leaf nodes under a particular higher-level node, the method comprising:
   obtaining IP addresses for interfaces of the network device; and
   obtaining some configuration parameters referenced by the leaf nodes for the network device; and
   obtaining other configuration parameters referenced by the higher-level nodes for the network device.

18. The method of claim 17, wherein the IP addresses for the interfaces of the network device are obtained from a first server which is not the LDAP server.

19. The method of claim 17, further comprising sending an LDAP request to the LDAP server, prior to obtaining the configuration parameters from the LDAP server.

20. The method of claim 17, further comprising configuring the network device with the configuration parameters obtained from the LDAP server.

21. The method of claim 17, further comprising authenticating the network device to the LDAP server prior to obtaining the configuration parameters from the LDAP server.

22. The method of claim 17, further comprising installing the network device in a network prior to obtaining IP addresses for the interfaces.

23. The method of claim 17, wherein the network device is a router or a switch.

24. The method of claim 17, further comprising performing an authentication exchange with the LDAP server.

25. The method of claim 17, wherein the configuration parameters include one or more of IP security parameters, traffic shaping parameters, and access list parameters.

26. A server apparatus providing configuration information for a plurality of network devices, the server apparatus comprising:
   one or more processors;
   memory coupled to the one or more processors;
   logic for creating a multi-level grouping of the plurality of network devices logically represented on at least one of the processors and memory; and
   logic for creating configuration parameter containers associated with specific levels of the grouping,
   wherein, at least some of the containers of parameters are associated with multiple network devices, and
   wherein the grouping includes
      leaf nodes, each leaf node representing a separate network device, at least some of the leaf nodes referencing configuration parameters associated with the separate network device; and
      higher-level nodes above the leaf nodes, the higher-level nodes referencing configuration parameters common to all network devices specified by leaf nodes under a particular higher-level node.

27. The server apparatus of claim 26, wherein the configuration parameter containers are stored in the memory.

28. The server apparatus of claim 26, wherein the configuration parameter containers include one or more objects, with each object belonging to particular configuration information.

29. The server apparatus of claim 26, wherein the multi-level grouping of the plurality of network devices is an LDAP directory.

30. The server apparatus of claim 26, wherein the multi-level grouping associates individual network devices with leaf nodes and associates groups of network devices with higher level nodes.

31. The server apparatus of claim 30, wherein configuration parameter containers associated with leaf nodes include information specific to the associated individual network devices.

32. The server apparatus of claim 30, wherein configuration parameter containers associated with higher level nodes include information common to multiple individual network devices associated with the leaf nodes under the higher level nodes.

33. A server apparatus providing configuration information for a plurality of network devices, the server apparatus comprising:
  a multi-level grouping of nodes representing the plurality of network devices, the multi-level grouping including
    leaf nodes, each leaf node representing a separate network device, at least some of the leaf nodes referencing configuration parameters associated with the separate network device, and
    higher-level nodes above the leaf nodes, the higher-level nodes referencing configuration parameters common to all network devices specified by leaf nodes under a particular higher-level node;
  configuration parameter containers associated with specific nodes of the grouping, wherein, at least some of the containers specify parameters associated with multiple network devices;
  means for identifying nodes associated with specific network devices;
  means for obtaining some configuration parameters referenced by the leaf nodes for the network device; and
  means for obtaining other configuration parameters referenced by the higher-level nodes for the network device.

34. The server apparatus of claim 33, wherein the means for obtaining configuration information obtains configuration parameters by tracing a hierarchical path through the nodes and checks for a configuration parameter containers at each of node.

35. A computer program product for configuring a network device, comprising:
  a computer readable medium; and
  computer readable code stored in the computer readable medium for causing a computer to:
    identify the network device to be configured;
    identify an entry for the network device from among a collection of network device entries in a directory, the directory including
      leaf nodes, each leaf node representing a separate network device, at least some of the leaf nodes referencing configuration parameters associated with the separate network device, and
      higher-level nodes above the leaf nodes, the higher-level nodes referencing configuration parameters common to all network devices specified by leaf nodes under a particular higher-level node;
    obtaining some configuration parameters referenced by the leaf nodes for the network device; and
    obtaining other configuration parameters referenced by the higher-level nodes for the network device.

36. The computer program product of claim 35, wherein the network device is a router or a switch.

37. The computer program product of claim 35, the computer readable code further causes the computer to authenticate a request from the network device for its configuration parameters.

38. The computer program product of claim 35, wherein the network device to be configured is identified by inspecting an IP packet from that network device.

39. The computer program product of claim 35, wherein the network device to be configured is identified in an LDAP request.

40. The computer program product of claim 39, wherein the network device to be configured is identified by its IP address provided in the LDAP request.

41. The computer program product of claim 35, wherein the collection of network device entries is provided in a hierarchical directory.

42. The computer program product of claim 41, wherein the hierarchical directory containing the collection of network device entries is an LDAP directory.

43. The computer program product of claim 35, wherein obtaining the configuration information includes aggregating configuration parameters from the plurality of nodes.

44. The computer program product of claim 35, wherein obtaining configuration information includes tracing a hierarchical path through the plurality of nodes.

45. A computer program product for configuring a network device based on a directory in an LDAP server, the directory including
  leaf nodes, each leaf node representing a separate network device, at least some of the leaf nodes referencing configuration parameters associated with the separate network device; and
  higher-level nodes above the leaf nodes, the higher-level nodes referencing configuration parameters common to all network devices specified by leaf nodes under a particular higher-level node, comprising:
  a computer readable medium; and
  computer readable code stored in the computer readable medium for causing a computer to:
    obtain IP addresses for interfaces of the network device; and
    obtain some configuration parameters referenced by the leaf nodes for the network device; and
    obtaining other configuration parameters referenced by the higher-level nodes for the network device.

* * * * *